United States Patent [19]
Okamura et al.

[11] Patent Number: 4,684,591
[45] Date of Patent: Aug. 4, 1987

[54] ACTIVE MATERIALS FOR BATTERIES

[75] Inventors: Kazuo Okamura, Itami; Satoshi Koyama, Osaka; Tadayuki Maeda, Settsu; Tutomu Kamihigoshi, Takatsuki, all of Japan

[73] Assignee: Daikin Kogyo Co., Ltd., Osaka, Japan

[21] Appl. No.: 793,465

[22] Filed: Oct. 29, 1985

Related U.S. Application Data

[63] Continuation of Ser. No. 618,697, Jun. 8, 1984, abandoned.

[30] Foreign Application Priority Data

Jun. 9, 1983 [JP] Japan ................................. 58-103667
Jul. 22, 1983 [JP] Japan ................................. 58-134678

[51] Int. Cl.$^4$ ............................................... A01M 4/58
[52] U.S. Cl. ..................................... 429/218; 429/194
[58] Field of Search ................................ 429/218, 194

[56] References Cited

U.S. PATENT DOCUMENTS

| | | | |
|---|---|---|---|
| 3,907,593 | 9/1975 | Marincic | 429/196 |
| 3,956,018 | 5/1976 | Kozawa | 429/218 X |
| 4,105,836 | 8/1978 | Almerini | 429/194 |
| 4,247,608 | 1/1981 | Watanabe et al. | 429/194 |

*Primary Examiner*—Brian E. Hearn
*Assistant Examiner*—Stephen J. Kalafut
*Attorney, Agent, or Firm*—Armstrong, Nikaido, Marmelstein & Kubovcik

[57] ABSTRACT

An active material for batteries or cells having improved discharge characteristics and comprising a fluorinated graphite produced by fluorination of graphite with fluorine, the fluorinated graphite containing substantially no unreacted graphite and having a degree of fluorination such that the weight or fluorine content thereof is increased by a further fluorination under conditions equal to or severer than the fluorination conditions adopted to the production of the fluorinated graphite. The use of artificial graphite having a Franklin's P-value of at least 0.45 as a starting material is effective for further improving the discharge voltage and the capacity.

3 Claims, 6 Drawing Figures

ACTIVE MATERIALS FOR BATTERIES

This application is a continuation of application Ser. No. 618,697 filed June 8, 1984, now abandoned.

BACKGROUND OF THE INVENTION

The present invention relates to an active material for batteries having improved discharge characteristics, which comprises a particular fluorinated graphite.

As fluorinated graphite obtained by reaction of graphite with fluorine, polycarbon monofluoride represented by the formula $(CF)_n$ and poly-dicarbon monofluoride represented by the formula $(C_2F)_n$ have been identified, and it is also known that a fluorinated graphite containing both of the above forms exists. However, their actual morphologies have not yet been fully made clear. It is well known, as will be mentioned below, that fluorinated graphite has desirable characteristics as an active material for batteries.

For example, Japanese Unexamined Patent Publication (Tokkyo Kokai) No. 25565/1973 discloses that the use of a solid fluorinated graphite of the formula $(CF_x)_n$ in which x is between 0.5 and 1, especially x being equal or close to 1, as an active material for a positive electrode provides a primary battery with a high energy density having a high utilization rate of active material, an excellent voltage flatness and a satisfactory shelf life.

Japanese Unexamined Patent Publication No. 102893/1978 discloses a fluorinated graphite of the formula $(C_2F)_n$ [which will hereinafter be referred to as $(C_2F)_n$] and a process for the preparation thereof. The $(C_2F)_n$ does not show an increase of fluorine content even when heated in an atmosphere of fluorine gas at 600° C., and it is also suggested that the $(C_2F)_n$ is used as an active material for batteries. It is also mentioned in Japanese Unexamined Patent Publication No. 28246/1980 that the above $(C_2F)_n$ shows a higher discharge voltage than does the fluorinated graphite of the formula $(CF)_n$ [which will hereinafter be referred to as $(CF)_n$].

Japanese Unexamined Patent Publication No. 84570/1982 proposes the use of a mixture of $(CF)_n$ and $(C_2F)_n$ as an active material for a positive electrode to thereby improve the transient drop of voltage in an initial stage of discharge which is the drawback of $(CF)_n$. Japanese Unexamined Patent Publication No. 16468/1983 discloses an active material for batteries predominantly composed of $(C_2F)_n$ obtained by reaction of artificial graphite with fluorine. It is described that the preferred $(C_2F)_n$-based active material is the product obtained by reaction of artificial graphite with fluorine until there is no increase in weight of the reaction product, and this active material shows a high discharge voltage.

It is an object of the present invention to provide an active material for batteries having an improved discharge voltage.

A further object of the invention is to provide an active material for batteries, which is obtained with an improved productivity.

These and other objects of the present invention will become apparent from the description hereinafter.

SUMMARY OF THE INVENTION

The present inventors investigated the formation of fluorinated graphite from graphite and fluorine, and have found that three reaction stages are present in the fluorination process of graphite, namely a first reaction stage where unreacted graphite remains in the reaction product, a second reaction stage where notwithstanding the absence of unreacted graphite, the fluorination reaction further proceeds to cause an increase in weight or fluorine content of the reaction product, and a third stage where there is no increase in weight or fluorine content, but further reaction would increase the crystallinity. It has also been found that the fluorinated graphites described in the prior art literatures all correspond to the reaction product in the above third stage. Further, the present inventors have found that the fluorinated graphite obtained in the second reaction stage has a discharge voltage higher than that of the fluorinated graphite obtained in the third reaction stage by 100 to 200 mV and, particularly, that a region of the degree of fluorination showing a higher discharge voltage is present outside the range preferred in the above-mentioned Japanese Unexamined Patent Publication No. 16468/1983.

In accordance with the present invention, there is provided an active material for batteries comprising a fluorinated graphite produced by reaction of graphite with fluorine, said fluorinated graphite containing essentially no unreacted graphite and having a degree of fluorination such that the weight or fluorine content thereof is increased by a further fluorination.

DETAILED DESCRIPTION

Figure 1:
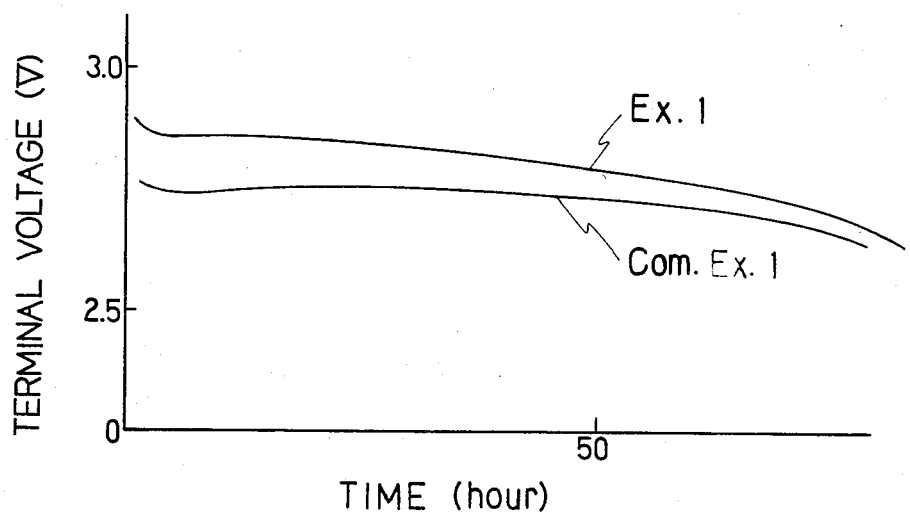
FIGS. 1 to 6 are graphs showing discharge characteristics, namely changes in terminal voltage with the lapse of time, of batteries using active materials obtained in Examples according to the present invention or active materials obtained in Comparative Examples.

It has not been known that a peculiar region of fluorinated graphite corresponding to the above-mentioned second reaction stage is present in the fluorination products of graphite. The fluorinated graphite according to the present invention is different from known fluorinated graphites which are obtained in the above-mentioned first and third reaction stages in that the fluorinated graphite according to the invention essentially does not contain unreacted graphite, but shows an increase in weight or fluorine content when subjected to a further fluorination. The fluorinated graphite according to the present invention is very suited for use as an active material for a battery or cell, and provides a battery or cell having improved discharge characteristics.

The X-ray powder diffraction analysis with the Cu-$K_\alpha$ line of the active material of the invention reveals no line corresponding to unreacted graphite for which a (002) line appears at a diffraction angle $2\theta$ of approximately 26.5°. The fluorinated graphite obtained in the first reaction stage in which unreacted graphite remains contains free fluorine. It has a high discharge voltage, but is not fully useful as an active material, because the free fluorine tends to detract from battery performance.

In addition to the characteristic feature of having essentially no unreacted graphite, the active material for batteries of the present invention is further characterized in that when it is subjected to a further fluorination, there occurs an increase in weight or fluorine content.

Throughout the specification and claims, the term "increase in weight" or equivalent means an increase in weight of at least about 1% by weight, preferably 2.5% by weight, more preferably at least 3% by weight. Also, the term "increase in fluorine content" or equivalent means an increase in fluorine content of at least about 0.5% by weight, preferably at least 1.5% by weight.

The further fluorination for verifying and ensuring that the magnitude of increase in weight or fluorine content conforms to the above requirement is conducted under the same conditions as or severer conditions than those used in the manufacture of the fluorinated graphite of the present invention, for instance, with respect to reaction temperature, pressure and concentration of fluorine. In case of the further fluorination under severer conditions, either one of temperature, pressure and fluorine concentration may be severer, namely higher, than those in the production of the fluorinated graphite of the invention.

One reason why the weight or fluorine content of the active material of the invention is increased by a further fluorination is presumed to be that, unlike conventional $(C_2F)_n$ which is apparently in a stable stage, the fluorinated graphite of the invention contains a new $(C_2F)_n$ in a transition state capable of converting into $(CF)_n$. It is considered that the improvement in discharge voltage realized by the invention is also based on the presence of new $(C_2F)_n$ in the transition state, and that the discharge voltage of the known fluorinated graphite being low as compared with the fluorinated graphite of the invention results from the fact that the $(C_2F)_n$ in the known fluorinated graphite is in the stable state.

The active material for batteries of the present invention is preferably a fluorinated graphite having a fluorine content of 48 to 58% by weight especially 49 to 56% by weight. The lower limit of 48% is not critical insofar as the discharge voltage is concerned, but below 48% the free fluorine generally remains occluded in fluorinated graphite, this being undesirable for the purposes of this invention. When the fluorine content is more than 58%, the desired improvement in discharge voltage cannot be realized.

In a X-ray powder diffraction pattern measured with the $Cu-K_\alpha$ line, the diffraction line of the active material for batteries of the invention appears at 9.9° to 14.5° in terms of an angle of $2\theta$, and in certain cases, the pattern shows a peak or shoulder assignable to $(C_2F)_n$ in the vicinity of 10°.

The graphite used as a starting material in the present invention includes, for instance, natural graphite, artificial graphite, artificial flaky graphite (e.g. XS and T Series made by Lonza Ltd.), and the like. An artificial graphite having a Franklin's P-value of at least 0.45, is preferred. Usually, the upper limit of the Franklin's P-value of artificial graphite is about 0.8 to 0.9. The larger the Franklin's P-value, the lower the crystallinity of graphite. The fluorinated graphite showing a diffraction line at 12° or a higher angle in terms of an angle of $2\theta$ obtained from an artificial graphite having a Franklin's P-value of at least 0.45 is particularly useful as an active material, since the discharge voltage is high and the capacity is large.

The active material of the present invention can be produced in a usual fluorination manner, for example, by fluorinating a starting material graphite with fluorine gas or a mixture of fluorine gas and a diluent gas, that is, a fluorine gas having a fluorine concentration of 10 to 100% by volume. Fluorine gas or a mixture of fluorine gas and a diluent gas is introduced at room temperature into a reactor in such a manner that the fluorine partial pressure is from 0.1 to 1 atm. The temperature is gradually elevated from room temperature and maintained at the desired reaction temperature which is usually from 300° to 500°C. preferably 300° to 450° C.

The conditions of the fluorination for producing the active material for batteries of the present invention can be determined as follows. For instance, the reaction is preliminarily conducted at predetermined temperature and pressure to determine the time from the initiation of reaction to the disappearance of unreacted graphite and the time until there is no increase in weight or fluorine content. Then, the actual reaction is conducted under the same conditions and terminated in the time frame between the above two times which corresponds to the further fluorination mentioned before. Alternatively, the reaction product is sampled at constant intervals to monitor the presence of unreacted graphite by X-ray powder diffraction analysis and terminated at a suitable time, while confirming the increase in weight or fluorine content due to further fluorination under the same or severer conditions than the previous fluorination conditions.

The reaction time varies depending on the degree of crystallinity and particle size of the starting graphite, pressure of fluorine gas, reaction temperature, etc. It is generally from 15 to 100 hours at a reaction temperature of 380° C. This reaction time is only one-half to one-tenth of the reaction time, i.e. 100 to 200 hours, which is required for the production of conventional fluorinated graphite at the same temperature as above, and accordingly the productivity can be remarkably improved according to the present invention.

The starting graphite is preferably degassed and dried at the same temperature as the reaction temperature prior to the reaction.

The diluent gas used for diluting fluorine gas should be a gas inert to both fluorine and graphite. Examples of the diluent gas are, for instance, nitrogen gas, perfluorocarbon gas and rare gas.

An electrode composition is obtained by admixing the active material for batteries of the invention with a binder and an electrically conductive material. Usually, the binder is used in an amount of 10 to 40 parts by weight, and the conductive material is used in an amount of 5 to 20 parts by weight, respectively based on 100 parts by weight of the active material. The composition can be easily molded into a desired form suitable as electrodes for batteries or cells.

The binder includes, for instance, polytetrafluoroethylene (PTFE), and the conductive material includes, for instance, a highly conductive carbon black such as acetylene black or Ketchen black, and natural graphite.

Batteries or cells can be fabricated in known manners by using the active material of the invention. It is preferable to use the active material as a positive electrode and a metal such as lithium, magnesium, calcium or aluminum or an alloy based thereon as a negative electrode. The electrolyte is generally a non-aqueous electrolyte, though depending on the type of negative electrode.

The present invention is more specifically described and explained by means of the following Examples, in which all parts and % are by weight unless otherwise noted. It is to be understood that the present invention is not limited to the Examples, and various changes and modifications may be made in the invention without departing from the spirit and scope thereof.

EXAMPLE 1 AND COMPARATIVE EXAMPLE 1

A reactor was charged with 10.0 g of artificial graphite (average particle size 15 μm) and degassed to remove moisture at 380° C. for 30 minutes, followed by cooling to room temperature.

Then, a fluorine gas (90% by volume) was introduced at 1 atm. into the reactor, and the temperature was raised to 380° C. and the reaction was conducted at that temperature for 16 hours. The reaction product was a blackish brown powder. The fluorine content was 52.8% and the weight was 21.1 g. X-ray powder diffraction analysis with the Cu-$K_\alpha$ line of this product showed no diffraction line due to graphite, but a line at 10.54° in terms of an angle of $2\theta$ (hereinafter referred to as $2\theta$).

A 10.00 g portion of the above product was taken and further fluorinated under the same conditions as above. After 114 hours from the start of this refluorination, there was obtained a product with a weight of 10.33 g (weight increase: 3.3%), a fluorine content of 54.5% (increase in fluorine content: 1.7%) and a line at 10.90° ($2\theta$). When the fluorination was further continued, there was no increase in weight and fluorine content. The above product obtained by the refluorination for 114 hours is referred to as the fluorinated graphite of Comparative Example 1.

Then, 10 parts of each of the above products was milled well with 3 parts of PTFE and 1 part of acetylene black, and the mixture was pressed on a nickel screen to form a positive electrode having an apparent surface area of 1.57 cm.$^2$ A plate having a surface area of 1 cm$^2$ and a thickness of 1 mm cut out of a lithium block was supported on a nickel screen to form a negative electrode, and a 1 mole/liter solution of lithium borofluoride in γ-butyrolactone was used as an electrolyte. The discharge voltage of the obtained battery was measured at 25° C. using a fixed resistance of 10 kiloohms. The change in terminal voltage with the lapse of time is shown in FIG. 1.

EXAMPLE 2 AND COMPARATIVE EXAMPLE 2

The fluorination was conducted in the same manner as in Example 1 except that artificial graphite having an average particle size of 20 μm was used as a starting graphite. The product obtained by the reaction for 16 hours was a blackish brown powder free of unreacted graphite. The fluorine content was 51.8% and the weight of 20.7 g. The X-ray powder diffraction analysis of the product revealed no diffraction line based on graphite, but showed a diffraction line at 11.41° ($2\theta$).

A 10.00 g portion of the above product was taken and further fluorinated under the same conditions as above. After this refluorination for 113 hours, there was obtained a product with a weight of 10.30 g. (increase in weight: 3.0%), a fluorine content of 54.0% (increase in fluorine content: 2.2%) and a line at 11.59° ($2\theta$). When the fluorination of the product was further continued, there was no increase in weight and fluorine content. The above product obtained by the refluorination for 113 hours is referred to as the fluorinated graphite of Comparative Example 2.

Figure 2:
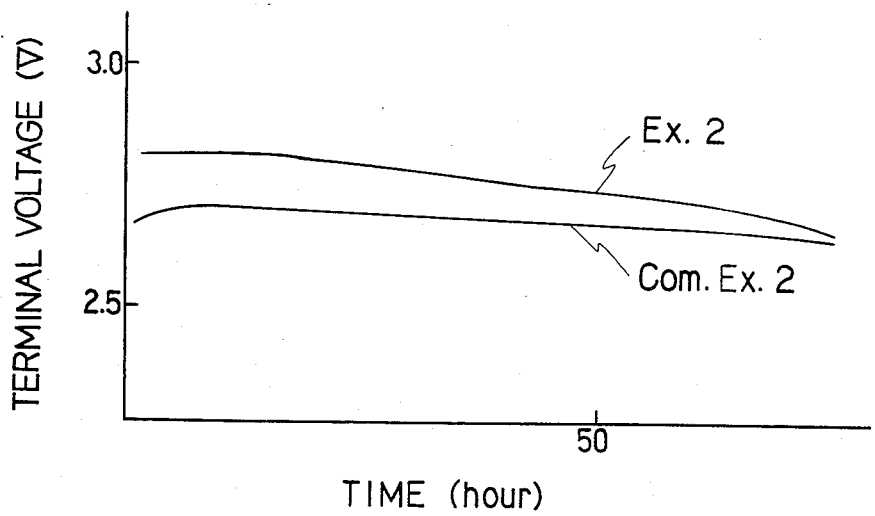

Using each of the above products of Example 2 and Comparative Example 2, batteries were fabricated in the same manner as in Example 1 and the terminal voltage was measured with the lapse of time. The results are shown in FIG. 2.

EXAMPLE 3 AND COMPARATIVE EXAMPLE 3

The fluorination was conducted in the same manner as in Example 1 except that 10.0 g of natural graphite (average particle size 10 μm) was used as a starting graphite and the reaction was terminated after 17 hours to give an active material of this invention. The product was a blackish brown powder free of unreacted graphite, and the fluorine content was 49.5% and the weight was 19.8 g. The X-ray powder diffraction analysis of this product revealed no diffraction line based on graphite, but showed a line at 10.41° ($2\theta$).

A 10.00 g portion of the above product was further subjected to fluorination under the same conditions as above. After 110 hours, there was obtained a product weighing 10.36 g (increase in weight: 3.6%) and having a fluorine content of 51.5% (increase in fluorine content: 2.0%) and a line at 10.10° ($2\theta$). Though the fluorination was further continued, there was no increase in weight and fluorine content. The above product obtained by the refluorination for 110 hours is referred to as the fluorinated graphite of Comparative Example 3.

Using each of the products of Example 3 and Comparative Example 3, batteries were fabricated in the same manner as in Example 1 and the terminal voltage was measured with the lapse of time. The results are shown in FIG. 3.

Figure 3:
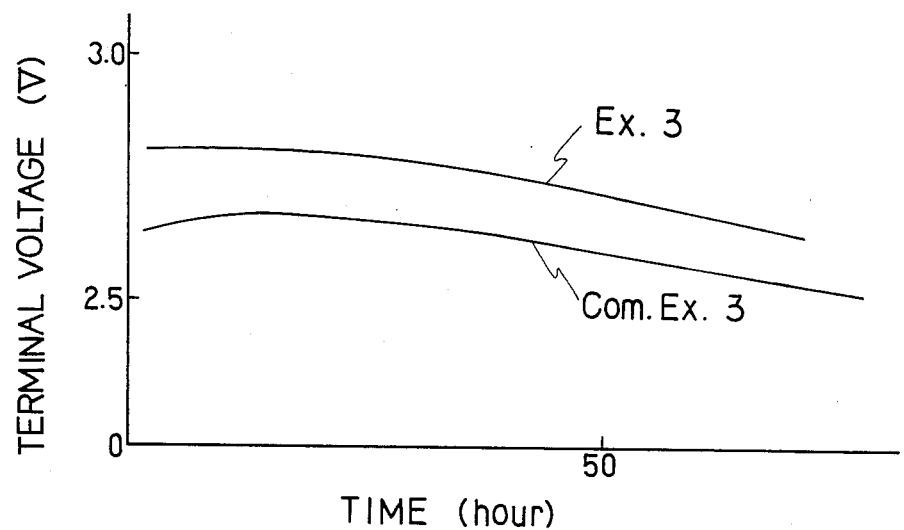

It will be apparent from FIGS. 1 to 3 that the active materials for batteries of the present invention have a higher discharge voltage as compared with those obtained in the third reaction stage described hereinbefore.

EXAMPLE 4

A reactor was charged with 10.0 g of artificial graphite (average particle size: 15 μm) and degassed to remove moisture at 330° C. for 30 minutes, followed by cooling to room temperature.

Then, fluorine gas (100%) was introduced at atmospheric pressure into the reactor and the temperature was raised to 330° C. The reaction was conducted at that temperature for 200 hours. The product was a blackish brown powder having a fluorine content of 49.7% and weighing 19.7 g. The X-ray powder diffraction analysis of the product revealed no diffraction lines for graphite, but a line at 10.60° ($2\theta$).

A 500.0 mg portion of the above product was further subjected to fluorination at a reaction pressure of 1 atm. and a reaction temperature of 470° C. using 100% fluorine gas. After 17 hours from the start of this refluorination, there was obtained a product weighing 534.0 mg (increase in weight: 6.8%) and having a fluorine content of 53.5% (increase in fluorine content: 3.8%). The above reaction was still further continued but there was no longer found an increase in weight and fluorine content.

Figure 4:
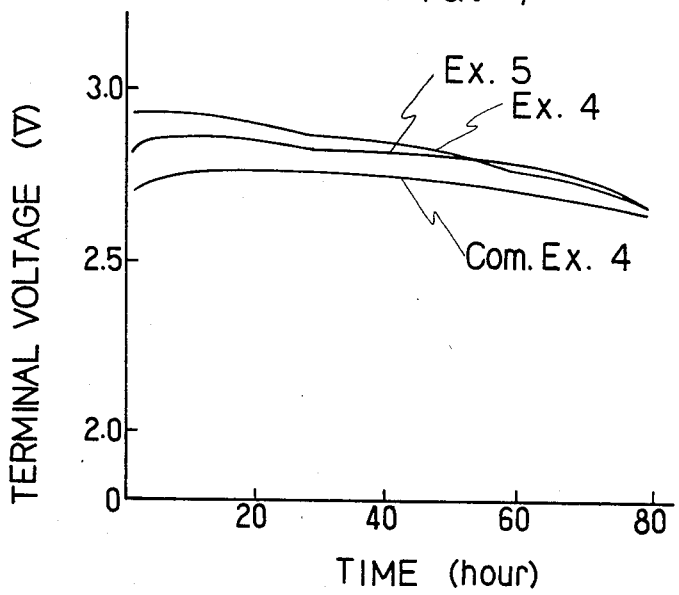

A battery was fabricated in the same manner as in Example 1 by using the product obtained prior to the refluorination as an active material for the positive electrode. The change in terminal voltage of the battery is shown in FIG. 4.

EXAMPLE 5

A reactor was charged with 10.0 g of artificial graphite (average particle size: 15 μm) and degassed to remove moisture at 380° C. for 30 minutes, followed by cooling to room temperature.

Fluorine gas (100%) was introduced at 1 atm. into the reactor and the temperature was raised to 380° C. The reaction was carried out at that temperature for 17 hours. The product thus obtained was a blackish brown powder having a fluorine content of 52.5% and weighing 21.0 g. The X-ray powder diffraction analysis of the product revealed no diffraction line for graphite but a line at 10.54° (2θ).

A 500.0 mg portion of the product was further fluorinated at 1 atm. and 470° C. Five hours after initiation of this refluorination reaction, there was obtained a product weighing 515.0 mg (increase in weight: 3.0%) and having a fluorine content of 54.5% (increase in fluorine content: 2.0%). Then, the above fluorination reaction was further continued but there was no increase in weight and fluorine content. Using the product prior to the above refluorination reaction, a battery was fabricated in the same manner as in Example 1, and the change in terminal voltage was observed. The result is shown in FIG. 4.

COMPARATIVE EXAMPLE 4

The fluorination was conducted in the same manner as in Example 5 except that the reaction time was 84 hours, to give 21.8 g of fluorinated graphite. The product was free of unreacted graphite and had a fluorine content of 54.5%. The X-ray powder diffraction analysis revealed no diffraction line for graphite but a line at 11.03° (2θ).

A 500.0 mg portion of the product was further fluorinated at 1 atm. and 470° C. Five hours after initiation of the refluorination, there was obtained a product weighing 500.3 mg (increase in weight: 0.06%) and having a fluorine content of 54.6% (increase in fluorine content: 0.1%).

Using the product prior to the refluorination, a battery was fabricated in the same manner as in Example 1 and the terminal voltage was measured with the lapse of time. The result is shown in FIG. 4.

EXAMPLE 6

A reactor was charged with 10.0 g of natural graphite (average particle size: 10 μm) and degassed to remove moisture at 380° C. for 30 minutes, followed by cooling to room temperature.

Fluorine gas (100%) was introduced at 1 atm. into the reactor and the temperature was raised to 380° C. The reaction was conducted at that temperature for 20 hours. The resulting product was a blackish brown powder having a fluorine content of 49.8% and weighing 19.9 g. The X-ray powder diffraction analysis of the product revealed no diffraction line due to graphite but a line at 10.38° (2θ).

A 500.0 mg portion of the above product was further subjected to fluorination at 1 atm. and 470° C. After 5 hours from the initiation of the refluorination, there was obtained a product weighing 507.5 mg (increase in weight: 1.5%) and having a fluorine content of 54.6% (increase in fluorine content: 4.8%). Then, the refluorination reaction was further continued but there was no longer an increase in weight and fluorine content.

Figure 5:
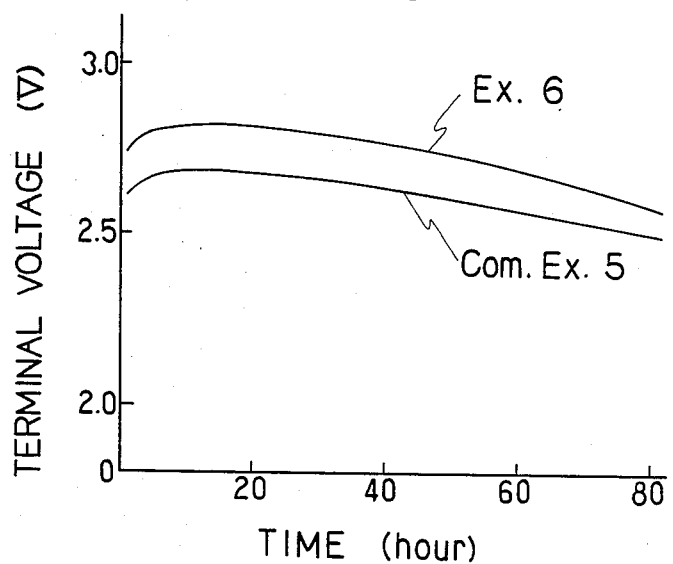

Using the product prior to the refluorination, a battery was fabricated in the same manner as in Example 1 and the terminal voltage was measured with the lapse of time. The result is shown in FIG. 5.

COMPARATIVE EXAMPLE 5

A reactor was charged with 10.0 g of natural graphite (average particle size: 10 μm) and degassed to remove moisture at 370° C. for 30 minutes, followed by cooling to room temperature.

Fluorine gas (100%) was introduced at 1 atm. into the reactor and the temperature was raised to 370° C. The reaction was conducted at that temperature for 140.4 hours. The resulting product had a fluorine content of 52.0% and weighed 21.4 g. The X-ray powder diffraction analysis of the product revealed no diffraction line due to graphite but a line at 10.08° (2θ).

A 500.0 mg portion of the above product was further subjected to fluorination at 1 atm. and 470° C. After 17 hours, there was obtained a product weighing 500.1 mg (increase in weight: 0.02%) and having a fluorine content of 52.1% (increase in fluorine content: 0.1%). Then, the fluorination was further continued but there was no longer an increase in weight and fluorine content.

Using the product prior to the refluorination, a battery was fabricated in the same manner as in Example 1 and the terminal voltage was measured with the lapse of time. The result is shown in FIG. 5.

It will be apparent from FIGS. 4 and 5 that the active materials for batteries of the invention show a higher discharge voltage than the active materials obtained in the third reaction stage.

EXAMPLE 7

A reactor was charged with 10.0 g of artificial graphite having a Franklin's P-value of 0.65, and was degassed to remove moisture at 360° C. for 30 minutes. After cooling to room temperature, a fluorine gas (fluorine concentration: 10% by volume) was introduced into the reactor at a rate of 300 ml/min., the temperature was elevated to 360° C. and the reaction was carried out at that temperature for 25 hours in the fluorine gas stream. The resulting fluorinated graphite had a fluorine content of 53.5% and showed a line at 14.02° (2θ), and showed a weight increase by further fluorination under the same conditions as above.

Figure 6:
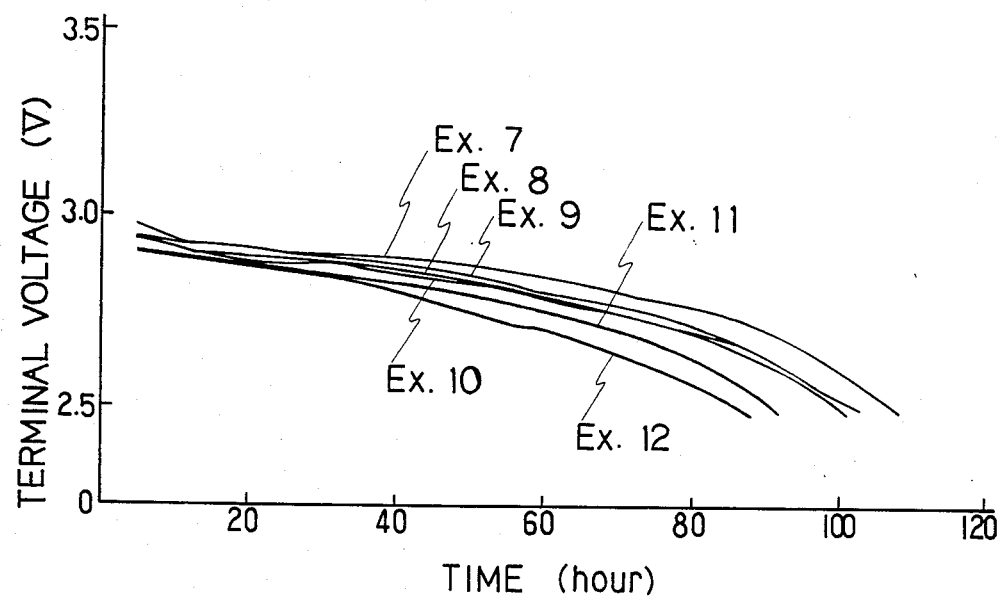

Using the thus obtained fluorinated graphite as an active material, a battery was fabricated in the same manner as in Example 1 and the discharge voltage was measured. The change in terminal voltage with the lapse of time is shown in FIG. 6.

The time until the terminal voltage reaches 2.5 V (the time being hereinafter referred to as "discharge time") of the battery was as long as 108 hours. Also, the capacity ratio (Whr/Whr) (ratio of the capacity Whr of a battery to the capacity Whr of the battery of Example 11 described after, hereinafter the same) was as large as 1.23.

EXAMPLES 8 TO 12

Artificial graphites having Franklin's P-values shown in Table 1 were reacted with fluorine under the conditions shown in Table 1. The fluorine content and diffraction angle 2θ of the obtained fluorinated graphites are shown in Table 1. These fluorinated graphites showed a weight increase by a further fluorination.

Using each of the obtained fluorinated graphites as an active material for a positive electrode, batteries were fabricated in the same manner as in Example 1 and the terminal voltage was measured with the lapse of time.

The results are shown in FIG. 6. The discharge time and capacity ratio are also shown in Table 1.

TABLE 1

| | Reaction Conditions | | | | Fluorinated graphite | | Discharge time (hour) | Capacity ratio (Whr/Whr) |
|---|---|---|---|---|---|---|---|---|
| | Franklin's P-value | Concentration of fluorine (vol. %) | Reaction temperature (°C.) | Reaction time (hour) | Fluorine content (%) | $2\theta$ (degree) | | |
| Ex. 7 | 0.65 | 10 | 360 | 25 | 53.5 | 14.02 | 108 | 1.23 |
| Ex. 8 | 0.65 | 20 | 360–380 | 31.8 | 52.9 | 13.41 | 101 | 1.13 |
| Ex. 9 | 0.49 | 100 | 360 | 24 | 54.1 | 12.40 | 103 | 1.15 |
| Ex. 10 | 0.49 | 20 | 380 | 41 | 55.1 | 12.46 | 101 | 1.12 |
| Ex. 11 | 0.31 | 90 | 380 | 15.5 | 51.6 | 10.46 | 91 | 1.00 |
| Ex. 12 | 0.31 | 20 | 380–390 | 24 | 51.6 | 10.50 | 86 | 0.90 |

It would be clear from FIG. 6 and Table 1 that the active materials produced from artificial graphite having a Franklin's P-value of at least 0.45 have improved discharge voltage, discharge time and capacity with a good balance.

In addition to the ingredients used in the Examples, other ingredients can be used in the Examples as set forth in the specification to obtain substantially the same results.

What we claim is:

1. An electrolytic cell comprising a positive electrode, a negative electrode and a non-aqueous electrolyte; said positive electrode consisting essentially of, as an active material, a fluorinated graphite produced by reacting graphite with fluorine until there is essentially no residual graphite, as shown by X-ray diffraction, such fluorinated graphite being further characterized as having a fluorine content of from 48 to 58% by weight and as being capable of absorbing additional fluorine in an amount of at least 0.5% by weight, as determined by refluorination of said fluorinated graphite under the same or more severe reaction conditions, and said negative electrode being a metal selected from the group consisting of lithium, magnesium, calcium, aluminum and alloys thereof.

2. The electrolytic cell of claim 1, wherein said graphite is an artificial graphite having a Franklin's P-value of at least 0.45.

3. The electrolytic cell of claim 1, wherein said fluorinated graphite is a fluorination product of an artificial graphite having a Franklin's P-value of at least 0.45 and shows a diffraction line in X-ray powder diffraction pattern with the Cu-K line at 12° or more in terms of an angle of 2θ.

* * * * *